United States Patent
Choi et al.

(10) Patent No.: US 7,801,084 B2
(45) Date of Patent: Sep. 21, 2010

(54) DOPPLER FREQUENCY DETERMINATION FOR MOBILE WIRELESS DEVICES

(75) Inventors: Yang-Seok Choi, Portland, OR (US); Siavash Alamouti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 11/449,916

(22) Filed: Jun. 9, 2006

(65) Prior Publication Data
US 2007/0286298 A1    Dec. 13, 2007

(51) Int. Cl.
*H04W 4/00*    (2009.01)
*H04W 36/00*   (2009.01)
*H04W 72/00*   (2009.01)
*H04K 1/10*    (2006.01)
*H04L 27/28*   (2006.01)

(52) U.S. Cl. .............. 370/332; 455/441; 455/452.1; 375/260

(58) Field of Classification Search ........... 455/436, 455/441, 67.11, 238.1, 434, 452.1, 452.2; 370/331, 334, 252, 328, 330, 332, 343, 478; 375/260, 262, 341, 343
See application file for complete search history.

(56) References Cited

U.S. PATENT DOCUMENTS

| | | | |
|---|---|---|---|
| 6,519,733 B1 | 2/2003 | Har et al. | |
| 6,640,088 B2 | 10/2003 | Thomas et al. | |
| 6,765,969 B1 | 7/2004 | Vook et al. | |
| 2003/0114164 A1* | 6/2003 | Thomas et al. | 455/452 |
| 2006/0176983 A1* | 8/2006 | Wadsworth et al. | 375/343 |
| 2006/0239364 A1* | 10/2006 | Wilhelmsson | 375/260 |
| 2007/0226588 A1 | 9/2007 | Lee et al. | |
| 2008/0107158 A1* | 5/2008 | Yoshii et al. | 375/146 |

FOREIGN PATENT DOCUMENTS

WO    WO-2007100694    9/2007

OTHER PUBLICATIONS

J. M. Holtzman, et al., "Adaptive averaging methodology for handoffs in cellular systems," IEEE Trans. on Vehicular Technology, vol. 44, No. 1, pp. 59-66, Feb. 1995.
L. Lindborn, "Adaptive equalization for fading mobile radio channels," Licentiate Dissertation Abstract, Technology Dept., Uppsala Univ., Uppsala, Sweden, 1992.
M. D. Austin, et al., "Eigen-based Doppler estimation for differentially coherent CPM," IEEE Trans. on Vehicular Technology, vol. 43, pp. 781-785, Mar. 1994.

(Continued)

*Primary Examiner*—George Eng
*Assistant Examiner*—Bryan Pitt
(74) *Attorney, Agent, or Firm*—Blakely, Sokoloff, Taylor & Zafman LLP (57) ABSTRACT

A technique for Doppler frequency estimation in Orthogonal Frequency Division Multiplexing (OFDM) systems. A frequency domain approach may be applied to any OFDM because it utilizes pilot subcarriers, and thus does not increase the system overhead. An estimator may be implemented as a relatively low-complexity finite impulse response (FIR) filter bank with coefficients that may be pre-calculated and stored in memory.

10 Claims, 6 Drawing Sheets

OTHER PUBLICATIONS

J. Cai, et al., "Doppler spread estimation for mobile OFDM systems in Rayleigh fading channels," IEEE Trans. on Consumer Electronics, vol. 49, pp. 973-977, Nov. 2003.

L. Krasny, et al., "Doppler spread estimation in mobile radio systems," IEEE Communication Letters, vol. 5, No. 5, pp. 197-199, May 2001.

T. Yucek, et al., "Doppler spread estimation for wireless OFDM systems," 2005 IEEE/Sarnoff Symposium on Advances in Wired and Wireless Comm., pp. 223-236, Apr. 2005.

Y.-S. Choi, et al., On channel estimation and detection for multicarrier signals in fast and selective Rayleigh fading channels, IEEE Trans. on Communications, vol. 49, pp. 1375-1387, Aug. 2001.

P. Stoica, et al., Introduction to Spectral Analisys, Saddle River, NJ: Prentice Hall, pp. 285-298, 1997.

U.S. Appl. No. 11/392,931, Lomnitz, et al.

PCT/RU2005/000490, Maltsev, et al.

PCT/US2007/070554 Search Report and Written Opinion mailed Nov. 7, 2007, 10 pgs.

European Search Report for European Patent Application No. 07784347.2 mailed Jun. 22, 2009, 14 pgs.

* cited by examiner

DOPPLER FREQUENCY DETERMINATION FOR MOBILE WIRELESS DEVICES

TECHNICAL FIELD

Embodiments of the invention relate to wireless communications. More particularly, embodiments of the invention relate to determination of speed of movement of a wireless mobile device using Doppler frequency information.

BACKGROUND

Orthogonal Frequency Division Multiplexing (OFDM) has been adopted by many wireless standards and has been implemented in many systems. The standards include, for example IEEE 802.11 and IEEE 802.16. IEEE 802.11 may include IEEE 802.11b, 802.11g, 802.11a, 802.11n and/or other parts of 802.11. IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. IEEE 802.16 corresponds to IEEE Std. 802.16-2004 "IEEE Standard for Local and Metropolitan Area Networks Part 16: Air Interface for Fixed Broadband Wireless Access Systems" and IEEE Std. 802.16e-2005 "IEEE Standard for Local and Metropolitan Area Networks Part 16: Air Interface for Fixed and Mobile Broadband Wireless Access Systems."

Currently, wireless communications systems are designed to function without knowledge of movement of the mobile units. For example, a cellular base station may not receive information describing movement of a mobile device subscribed to the base station. This requires the base station to react to changes caused by movement of the mobile device and may require unnecessary overhead to assure acceptable network performance. Thus, current wireless communication systems may suffer from ineffiencies.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The maximum Doppler frequency, $f_d$, is the ratio of the speed of a mobile device to the carrier wavelength. Knowledge of mobile device speed may allow improvement of system performance in a multi-cell wireless communication system. For example, in a pico-cell deployment overlaying macro-cells, the Doppler frequency information for the mobile devices may allow improvement in user assignments to proper base stations and thus reduce the number of handovers required. The mobile device speed may also be helpful in implementation of physical- and network-layer functions such as, for example, adaptive and fast link adaptation, and accurate channel prediction. Thus, scheduler gain due to multiuser diversity and spectral efficiency of the system may be increased. Other advantages may also be recognized as a result of accurate Doppler frequency information.

Described herein is a technique for Doppler frequency estimation in Orthogonal Frequency Division Multiplexing (OFDM) systems. The technique is a frequency domain approach that may be applied to any OFDM protocol because the technique utilizes pilot subcarriers, and thus does not increase the system overhead. An estimator may be implemented as a relatively low-complexity finite impulse response (FIR) filter bank with coefficients that may be pre-calculated and stored in memory. In one embodiment, determination of intercarrier interference (ICI) may be provided to avoid use of an error floor as is commonly used in current estimation systems.

Figure 1:
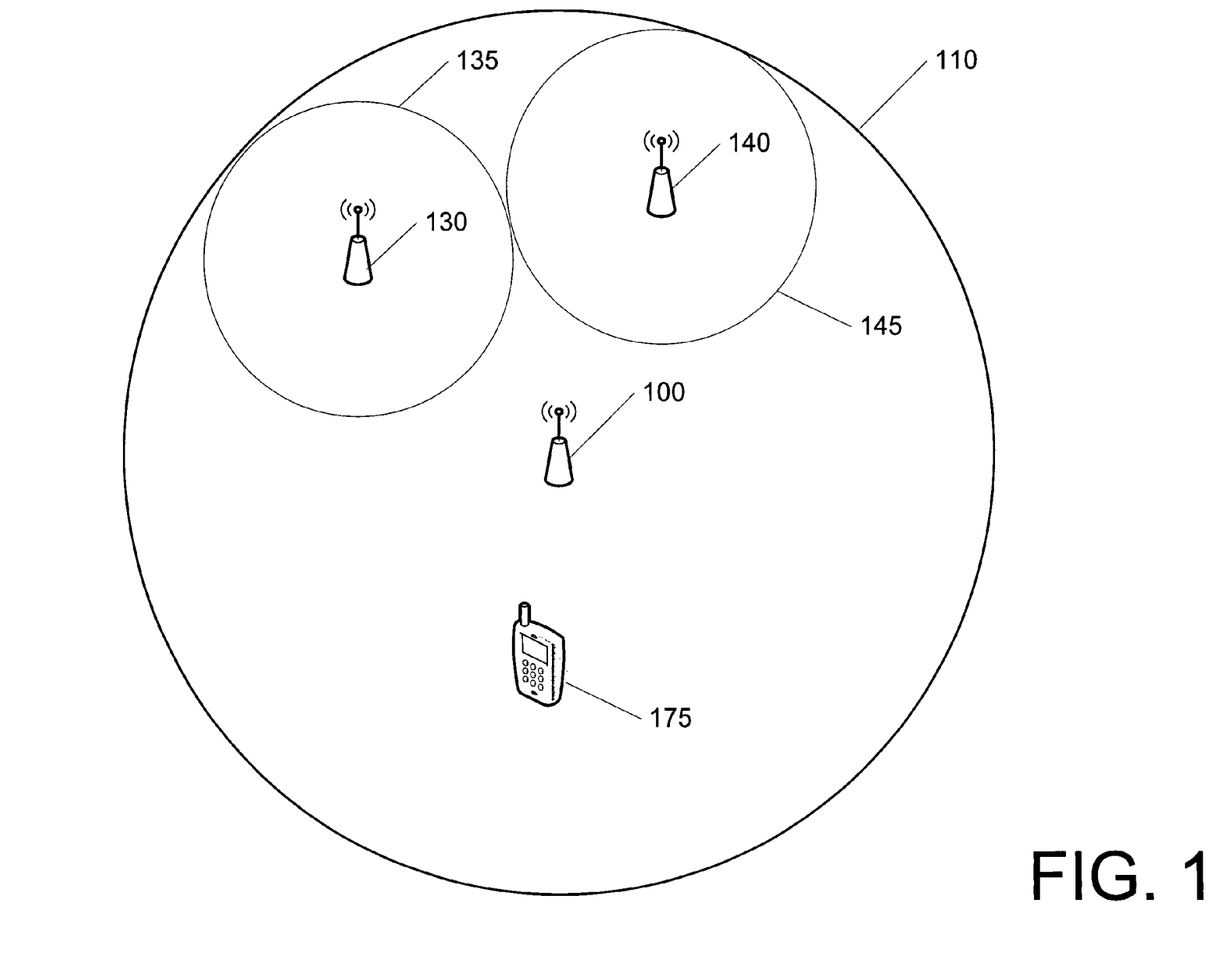
FIG. 1 is a conceptual diagram of one embodiment of a wireless network.

FIG. 1 is a conceptual diagram of one embodiment of a wireless network. The wireless network may support communications utilizing any type of OFDM-based protocol. The wireless network may also support additional protocols. The wireless network may be used, for example, for cellular voice communications and/or data transfer.

Base station 100 may provide an access point for wireless communications for one or more mobile wireless devices such as, for example, wireless mobile device 175. Any number of wireless mobile devices may be supported. A wireless mobile device may be, for example, a cellular telephone, a laptop computer, a personal digital assistant, a smart phone, or any other wireless-enabled device. Base station 100 may have a range (e.g., 1 km) corresponding to cell 110.

As mobile wireless device 175 moves within cell 110, it may communicate with base station 100. If mobile wireless device 175 exits cell 110, it may be transferred to another base station (not illustrated in FIG. 1). The process of passing wireless mobile device 175 from one base station to another may be referred to as a handover. In general, handovers have an associated overhead that may consume network resources.

In some network configurations a cell (e.g., 110) may include one or more picocells (e.g., 135, 145), each of which may have a corresponding base station (e.g., 130, 140). A picocell may be an area (e.g., 100 m) in which a picocell base station may provide improved coverage for mobile wireless devices to fill coverage holes or provide higher overall capacity. A picocell may be implemented, for example, in a building for cellular phone service or an airplane for wireless networking.

By determining the movement of a mobile wireless device as described herein a base station (or other network component) may reduce frequent handovers, provide more efficient handovers, improved signal quality and/or other advantages that may not be available without information related to movement of the mobile wireless device.

The techniques described herein may be implemented in hardware, firmware or any combination thereof, generically referred to as an agent. In the description that follows, the transmitted OFDM signal may be written as:

$$x(m) = \frac{1}{\sqrt{N}} \sum_{k=0}^{N-1} d_k e^{j2\pi km/N} \qquad \text{Eq. 1}$$

where N is the FFT size or total number of subcarriers, $d_k$, is the transmitted data or pilot signal. In null subcarriers $d_k$ is zero. The received OFDM signal at time m through a time-varying multipath channel may be written as:

$$y(m) = \sum_{l=0}^{T_d-1} h_l(m) x(m-1) + w(m) \qquad \text{Eq. 2}$$

where w(m) is additive white Gaussian noise (AWGN) with zero mean and variance of 1/SNR, $h_l$ (m) is the channel gain of the l-th multipath at time m.

After discarding the guard interval and FFT operation, the k-th output of the FFT may be written as:

$$Y_k = \frac{1}{\sqrt{N}} \sum_{m=0}^{N-1} y(m) e^{-j2\pi km/N} = d_k H_k + \alpha_k + W_k \qquad \text{Eq. 3}$$

where $H_k$ represents the channel effect and may be written as:

$$H_k = \frac{1}{N} \sum_{m=0}^{N-1} H_k(m) \qquad \text{Eq. 4}$$

and $$H_k(m) = \sum_{l=0}^{T_d-1} h_l(m) e^{-j2\pi kl/N} \qquad \text{Eq. 5}$$

further where (in Eq. 3) $\alpha_k$ represents the inter-channel interference (ICI), which may be written as:

$$\alpha_k = \frac{1}{N} \sum_{m=0,m\neq k}^{T_d-1} d_m \sum_{u=0}^{N-1} H_m(u) e^{j2\pi u(m-k)/N} \qquad \text{Eq. 6}$$

and (also in Eq. 3) $W_k$ may be written as:

$$W_k = \frac{1}{\sqrt{N}} \sum_{u=0}^{N-1} w(u) e^{j2\pi uk/N} \qquad \text{Eq. 7}$$

In one embodiment, in order to allow the use of more than one OFDM symbol to estimate the maximum Doppler frequency, a certain amount of latency may be considered acceptable. When multiple OFDM symbols are considered, Eq. 3 can be replaced with:

$$Y_{k,n} = d_{k,n} H_{k,n} + \alpha_{k,n} + W_{k,n} \qquad \text{Eq. 8}$$

Where n denotes the n-th OFDM symbol.

Because $d_{k,n}$, k∈P may be known where P is a set of indices of pilot subcarriers, a noisy estimate of a channel may be represented by:

$$\tilde{H}_{k,n} = Y_{k,n}/d_{k,n} \qquad \text{Eq. 9}$$

or $$\tilde{H} = H_{k,n} + \alpha_{k,n}/d_{k,n} + W_{k,n}/d_{k,n} \qquad \text{Eq. 10}$$

Because $|d_k|=1$, the cannel estimation vector of the k-th subcarrier over M consecutive OFDM symbols may be written as:

$$\tilde{H}_k = [\tilde{H}_{k,n}, \tilde{H}_{k,n+1}, \ldots, \tilde{H}_{k,n+M-1}]^T \qquad \text{Eq. 11}$$

Figure 2:
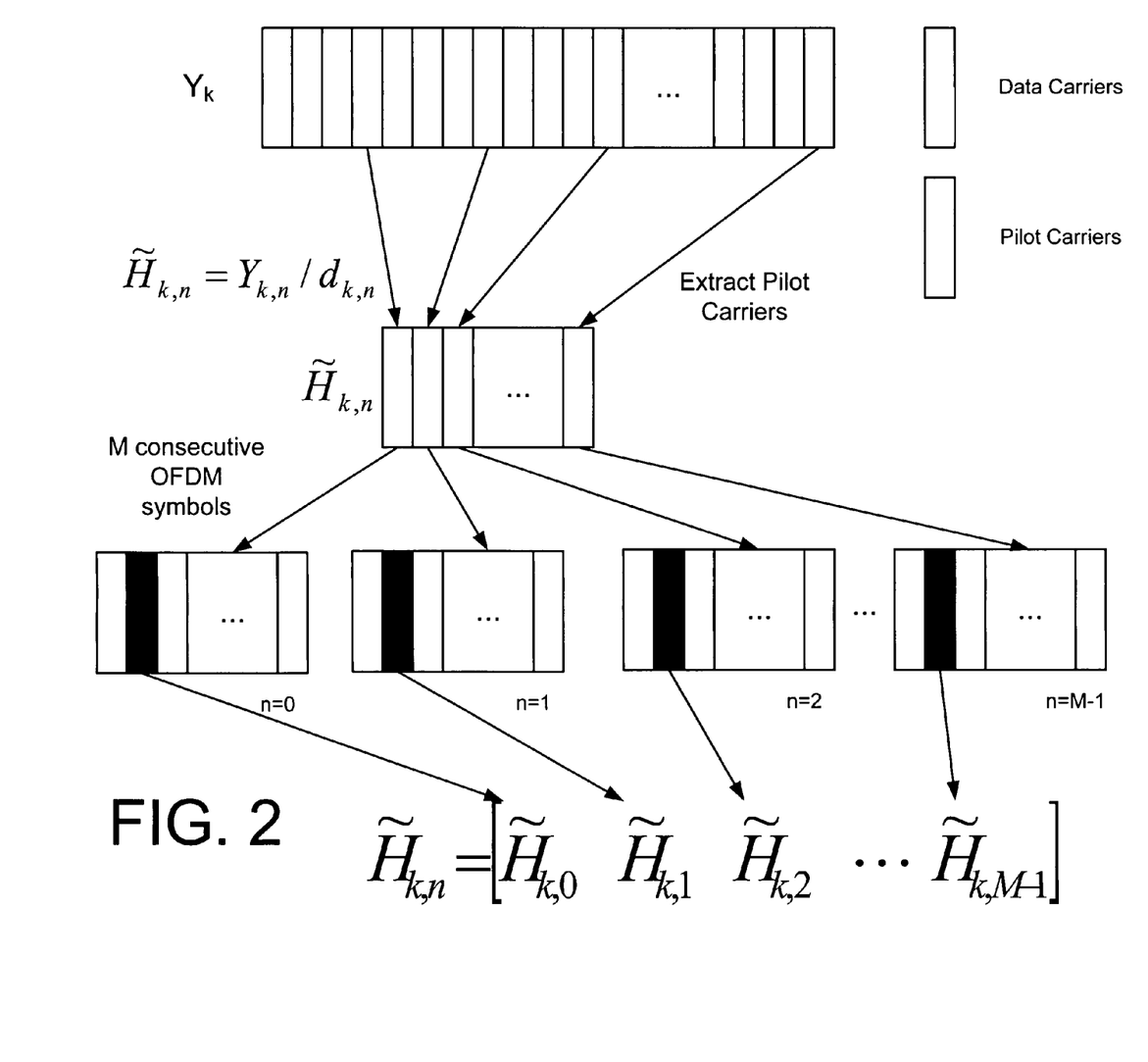
FIG. 2 is a conceptual block diagram of $\tilde{H}_k$

FIG. 2 is a conceptual block diagram of $\tilde{H}_k$.

The probability density function (pdf) of the ICI compnent, $\alpha_k$, may be a weighted Gaussian mixture pdf. However, through the central limit theorem, ICI may be approximated as a complex Gaussian random variable. $\tilde{H}_k$ may be modeled as a zero-mean, circularly symmetric, complex Gaussian vector with the following pdf:

$$p(\tilde{H}_k) = (\pi^M \det(R))^{-1} \exp(-H_k^H R^{-1} \tilde{H}_k) \qquad \text{Eq. 12}$$

where R is the autocorrelation matrix of vector $\tilde{H}_k$.

In one embodiment, the autocorrelation matrix of vector $\tilde{H}_k$ may be obtained using the following:

$$E\{H_{k,n+\Delta n} H_{k,n}^*\} = \frac{1}{N^2} \sum_{l_1=0}^{N-1} \sum_{l_2=0}^{N-1} J_0 \left( \frac{2\pi f_d T(l_1 - l_2 + \Delta n(N + N_G))}{N} \right) \qquad \text{Eq. 13}$$

where T is the symbol duration excluding the guard interval, $N_G$ is the guard interval in samples and $f_d$ is the Doppler frequency in Hz.

$$E\{\alpha_{k,n+\Delta n} \alpha_{k,n}^*\} = \frac{1}{N^2} \sum_{m_1=0, m_1\neq k}^{N-1} \sum_{m_2=0, m_2\neq k}^{N-1} E\{d_{m_1,n+\Delta n} d_{m_2,n}^*\} \times$$
$$\sum_{l_1=0}^{N-1} \sum_{l_2=0}^{N-1} r_f(m_1 - m_2) J_0 \left( \frac{2\pi f_d T(l_1 - l_2 + \Delta n(N+N_G))}{N} \right) \times$$
$$e^{j2\pi(l_1+\Delta n(N+N_G))(m_1-k)/N} e^{-j2\pi l_2(m_2-k)/N} \qquad \text{Eq. 14}$$

where $r_f(\Delta k)$ represents frequency domain correlation.

In exponential decaying delay profile $$r_f(\Delta k) = c \sum_{l=0}^{T_d-1} e^{-l\tau_{rms}/T_d} e^{-j2\pi\Delta k/N} \qquad \text{Eq. 15}$$

In general, the delay profile information may not be available. In this case $r_f(\Delta k)=1$ may be used. In one embodiment, $E\{d_{m_1,n+\Delta n} d_{m_2,n}^*\}$ may be obtained based on the nature of the data (e.g., whether the data is a known pilot or null or random data). The correlation between the channel and the ICI may be described as:

$$E\{H_{k,n+\Delta n}\alpha_{k,n}^*\} = \frac{1}{N^2} \sum_{m=0, m\neq k}^{N-1} E\{d_{m,n}^*\} \times \sum_{l_1=0}^{N-1}\sum_{l_2=0}^{N-1} r_f(k-m)$$
$$J_0\left(\frac{2\pi f_d T(l_1 - l_2 + \Delta n(N+N_G))}{N}\right) e^{-j2\pi l_2(m-k)/N} \quad \text{Eq. 16}$$

The maximum likelihood estimation (MLE) is equivalent to the minimum cost function:

$$\Lambda_k(f_dT) = \ln \det(R) + \tilde{H}_k^H R^{-1} \tilde{H}_k \quad \text{Eq. 17}$$

Thus, the MLE using the k-th subcarrier may be written as:

$$f_dT = \arg\min_{f_dT} \Lambda_k(f_dT) \quad \text{Eq. 18}$$

In one embodiment, the complexity of the MLE may be reduced via Cholesky factorization:

$$\min_{f_dT} \Lambda_k(f_dT) = \min_{f_dT} \ln\det(R) + \|L^H \tilde{H}_k\|^2 \quad \text{Eq. 19}$$

where $R^{-1} = LL^H$ and the lower triangular matrix L is defined as:

$$L = \begin{bmatrix} l_{1,1} & 0 & 0 & \cdots & 0 \\ l_{2,1} & l_{2,2} & 0 & \cdots & 0 \\ l_{3,1} & l_{3,2} & l_{3,3} & \ddots & \vdots \\ \vdots & \vdots & \vdots & \ddots & 0 \\ l_{M,1} & l_{M,2} & l_{M,3} & \cdots & l_{M,M} \end{bmatrix} \quad \text{Eq. 20}$$

The matrix L may be pre-calculated and stored using a predetermined set of $f_dT$ values, for example, $f_dT=0\sim0.04$ with a step size of 0.001.

Figure 3:
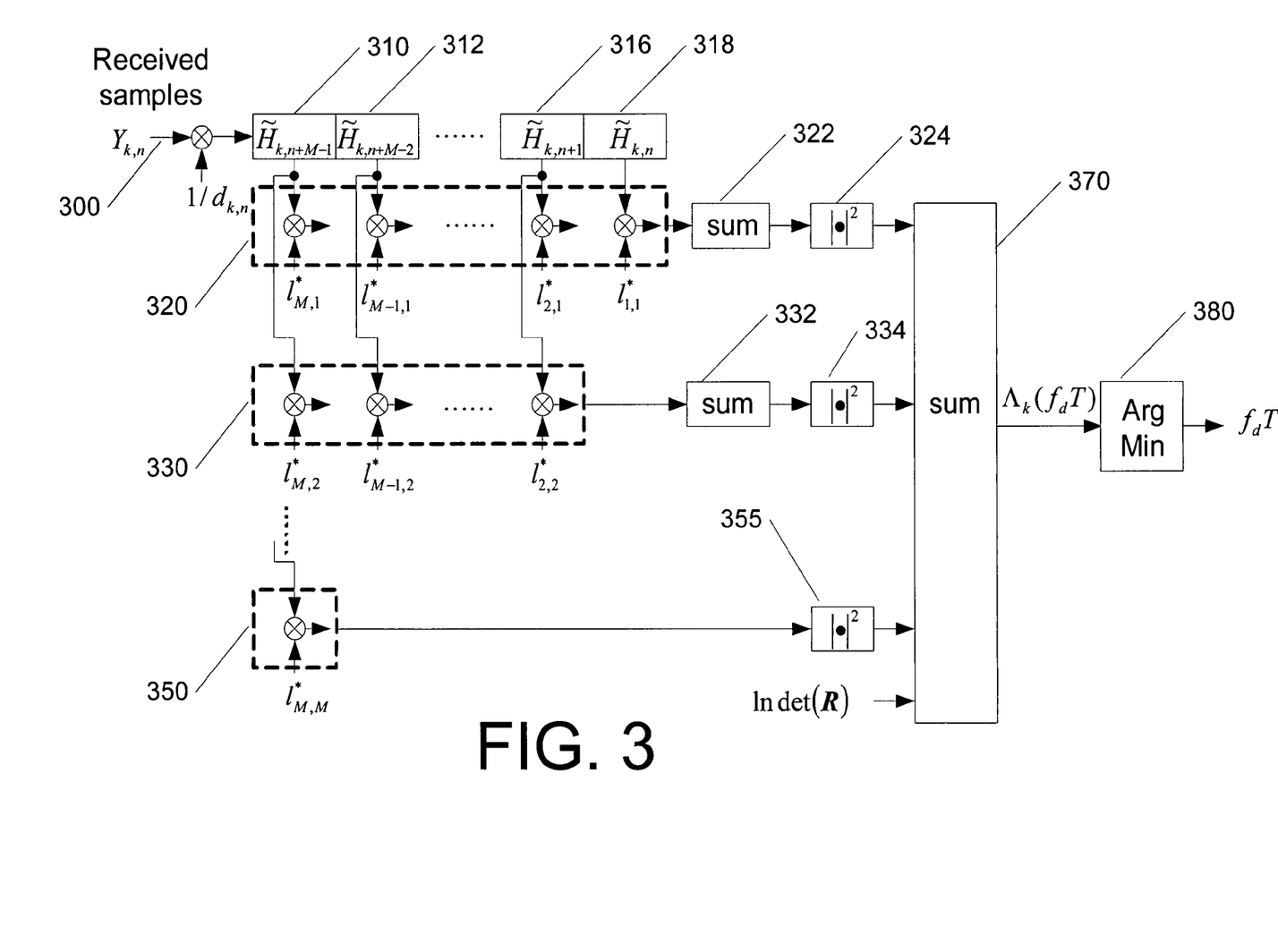
FIG. 3 is a conceptual diagram of one embodiment of a maximum likelihood estimation agent.

FIG. 3 is a conceptual diagram of one embodiment of a maximum likelihood estimation agent. The maximum likelihood estimation agent illustrated in FIG. 3 may be implemented as hardware, software, firmware or any combination thereof.

Received samples, $Y_{k,n}$, 300 may be received and combined with $1/d_{k,n}$ to generate channel estimates ($\tilde{H}_{k,n+M-1} \cdots \tilde{H}_{k,n}$) 310, 312, 316, 318. The channel estimates may be combined with the pre-calculated values of matrix L (320, 330 ... 350) as described above. Each row may be summed (322, 332 ...) and squared (324, 334 ... 355).

The result may be summed, 370, with ln det(R) to generate $\Lambda(f_dT)$. Then $$\arg\min_{f_dT}\Lambda_k(f_dT),$$

380 may be performed to generate $f_dT$. The resulting value may be used to determine movement of the source mobile wireless devices. The movement data may be used, for example, to facilitate a handover or to adjust transmission parameters by the base station and/or the mobile device.

In one embodiment, the complexity may be further reduced by low rank approximation. To accomplish this the implementation may be modified to permute elements in $\tilde{H}_k$ and thus auto-correlation matrix R as well in order to have decreasing power of the diagonal components of L. If E is the permutation matrix that yields the above property, then $$\tilde{\tilde{H}}_k = E^T \tilde{H}_k \quad \text{Eq. 21}$$

$$\tilde{R} = E\{\tilde{\tilde{H}}_k \tilde{\tilde{H}}_k^H\} = E^T RE \quad \text{Eq. 22}$$

and $$\tilde{R}^{-1} = E^T R^{-1} E \quad \text{Eq. 23}$$

Applying Cholesky factorization to $\tilde{R}^{-1}$ $$\tilde{R}^{-1} = \tilde{L}\tilde{L}^H \quad \text{Eq. 24}$$

where $$\tilde{L} = \begin{bmatrix} \tilde{l}_{1,1} & 0 & 0 & \cdots & 0 \\ \tilde{l}_{2,1} & \tilde{l}_{2,2} & 0 & \cdots & 0 \\ \tilde{l}_{3,1} & \tilde{l}_{3,2} & \tilde{l}_{3,3} & \ddots & \vdots \\ \vdots & \ddots & \ddots & \ddots & 0 \\ \tilde{l}_{M,1} & \tilde{l}_{M,2} & \tilde{l}_{M,3} & \cdots & \tilde{l}_{M,M} \end{bmatrix} \quad \text{Eq. 25}$$

Figure 4:
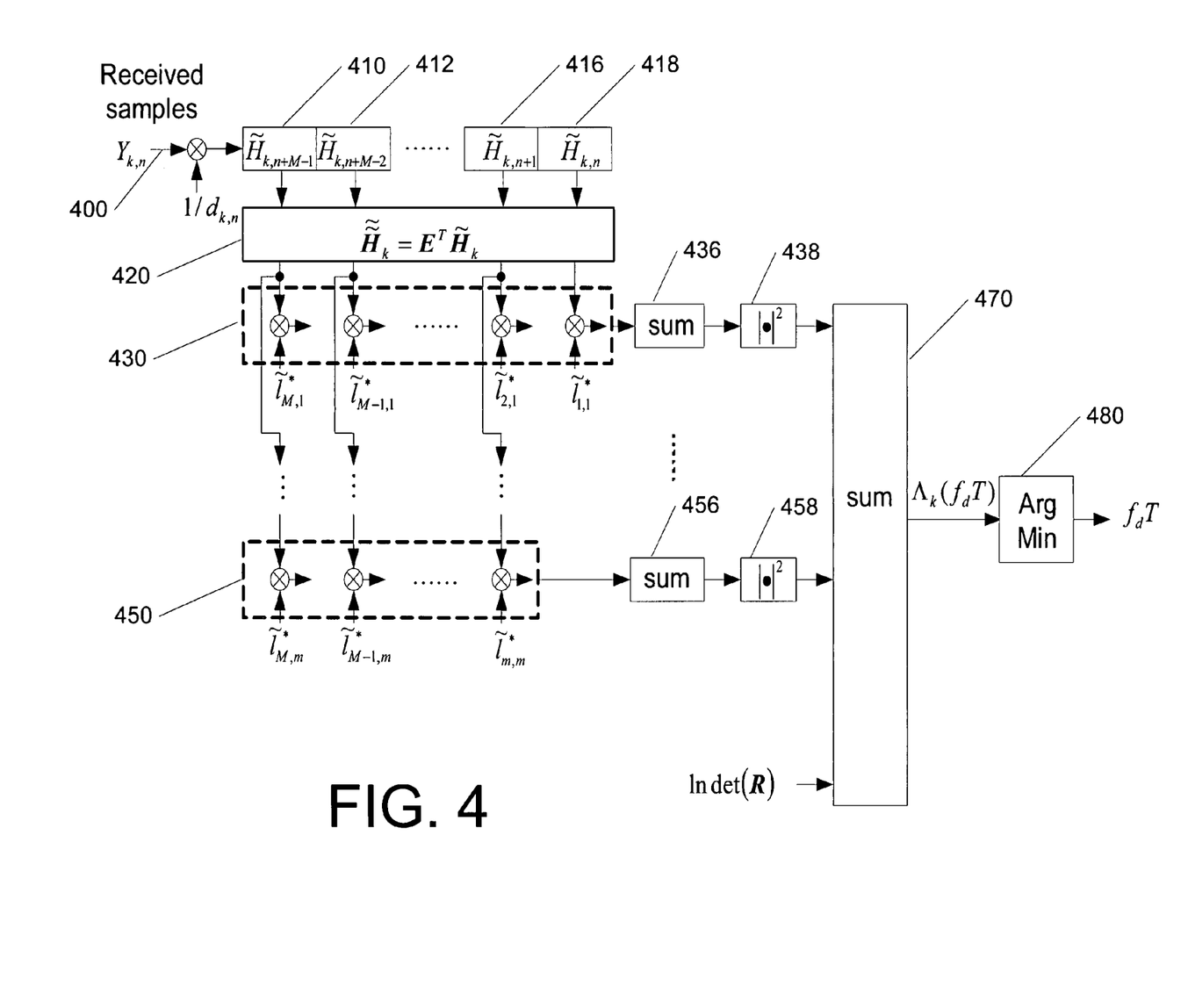
FIG. 4 is a conceptual diagram of one embodiment of a simplified maximum likelihood estimation agent.

FIG. 4 is a conceptual diagram of one embodiment of a simplified maximum likelihood estimation agent. The simplified estimation agent is based on the low rank approximation described above. The simplified maximum likelihood estimation agent illustrated in FIG. 4 may be implemented as hardware, software, firmware or any combination thereof.

Received samples, $Y_{k,n}$, 400 may be received and combined with $1/d_{k,n}$ to generate channel estimates ($\tilde{H}_{k,n+M-1}, \ldots, \tilde{H}_{k,n}$) 410, 412, 416, 418. The channel estimates may be permuted, 420, as described above and combined with the pre-calculated values of matrix L (430 ... 450) as described above. Each row may be (436, 456 ...) and squared (438 ... 458).

The result may be summed, 470, with ln det(R) to generate $\Lambda(f_dT)$. Then $$\arg\min_{f_dT}\Lambda_k(f_dT),$$

480 may be performed to generate $f_dT$. The resulting value may be used to determine movement of the source mobile wireless devices. The movement data may be used, for example, to facilitate a handover or to adjust transmission parameters by the base station and/or the mobile device.

Figure 5:
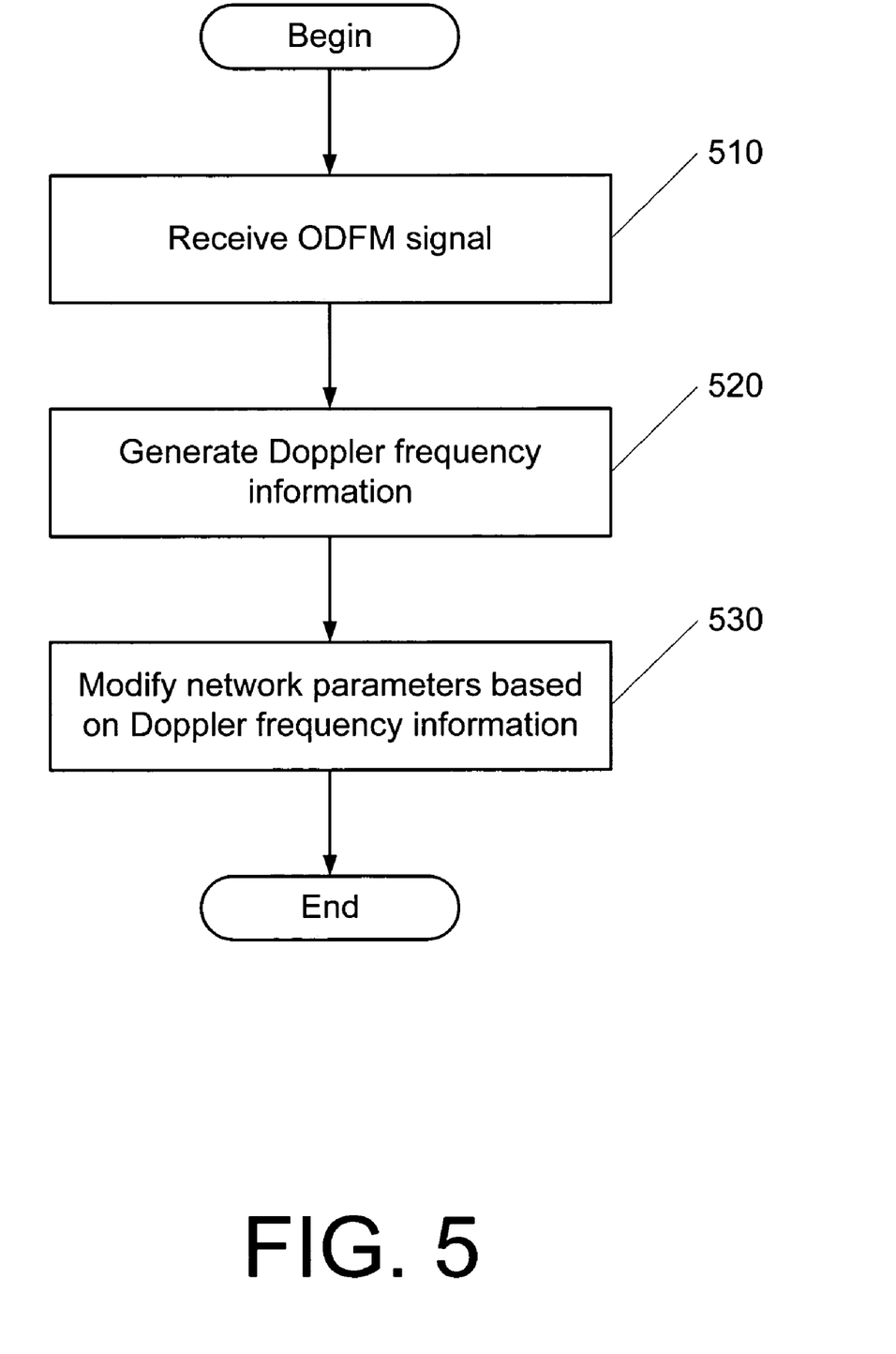
FIG. 5 is a flow diagram of one embodiment of a technique for utilizing Doppler frequency information in a wireless communications network.

FIG. 5 is a flow diagram of one embodiment of a technique for utilizing Doppler frequency information in a wireless communications network. As mentioned above, the techniques described herein may be applied to any OFDM communications environment. In one embodiment, the technique may utilize pilot and data carriers as defined by existing standards based on OFDM communications. Thus, the technique may not require changes to existing communications standards.

An OFDM signal may be received, 510. The signal may be received in any manner known in the art. In one embodiment, the pilot carriers may be extracted as illustrated in FIG. 2. The extracted pilot carriers may be processed as described above to generate Doppler frequency information, 520.

The Doppler frequency information may be used to modify network parameters, 530. Modification of network parameters may include, for example, prediction and corresponding compensation of change in channel quality, reduction and/or prediction of handovers, a reduction or modification of channel quality overhead transmissions. Doppler frequency information may also be utilized to improve network layer and MAC layer functionality.

Figure 6:
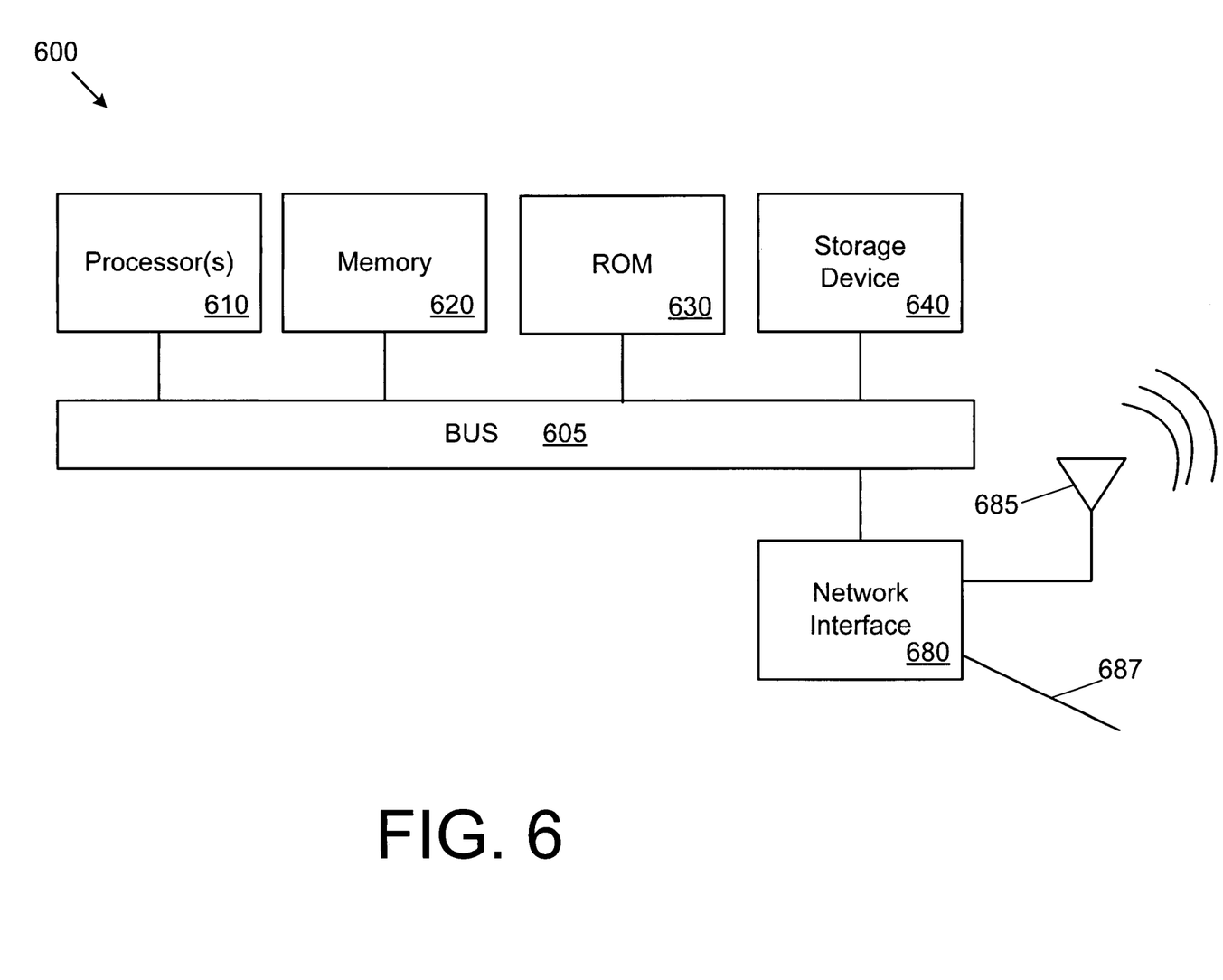
FIG. 6 is a block diagram of one embodiment of a base station.

FIG. 6 is a block diagram of one embodiment of a base station. The base station illustrated in FIG. 6 is intended to represent a range of base stations (e.g., for a macrocell, for a picocell). Alternative base stations may include more, fewer and/or different components. A mobile wireless device including, for example, for cellular telephones, wireless data communications, etc., may have the same or a similar architecture.

Base station 600 may include bus 605 or other communication device to communicate information, and processor 610 coupled to bus 605 that may process information. While base station 600 is illustrated with a single processor, base station 600 may include multiple processors and/or co-processors. Base station 600 further may include random access memory (RAM) or other dynamic storage device 620, coupled to bus 605 and may store information and instructions that may be executed by processor 610. For example, the process of FIG. 5 may be implemented as instructions stored in memory 620 that are executed by processor 610. Memory 620 may also be used to store temporary variables or other intermediate information during execution of instructions by processor 610.

Base station 600 may also include read only memory (ROM) and/or other static storage device 630 coupled to bus 605 that may store static information and instructions for processor 610. Data storage device 640 may be coupled to bus 605 to store information and instructions. Data storage device 640 such as a magnetic disk or optical disc and corresponding drive may be coupled to base station 600.

Base station 600 further may include network interface(s) 680 to provide access to a network. Network interface(s) 680 may include, for example, a wireless network interface having antenna 685, which may represent one or more antenna(e) that may communicate utilizing OFDM protocols. Network interface(s) 680 may also include, for example, a wired network interface to communicate with remote devices via network cable 687, which may be, for example, an Ethernet cable, a coaxial cable, a fiber optic cable, a serial cable, or a parallel cable.

A computer-readable medium includes any mechanism that provides (e.g., memory 620, ROM 630, storage device 640) content (e.g., computer executable instructions) in a form readable by an electronic device (e.g., a computer, a personal digital assistant, a cellular telephone). For example, a computer-readable medium includes read only memory (ROM); random access memory (RAM); magnetic disk storage media; optical storage media; flash memory devices, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a multi-path Orthogonal Frequency Division Multiplexed (OFDM) signal from a remote mobile wireless device;
   extracting multiple pilot carriers from the signal;
   performing a frequency domain analysis on the extracted pilot carriers to determine a Doppler frequency corresponding to the remote mobile wireless device, wherein the Doppler frequency comprises the ratio of the speed of the remote mobile wireless device to the carrier wavelength, wherein performing a frequency domain analysis on the extracted pilot carriers to determine a Doppler frequency corresponding to the remote mobile wireless device comprises:
   generating a plurality of channel estimates corresponding to the extracted pilot carriers, and
   performing maximum likelihood estimations $$\left( \min_{f_d T} \Lambda_k(f_d T) = \min_{f_d T} \text{lndet}(R) + \left\| L^H \tilde{H}_k \right\|^2 \right)$$

on the plurality of channel estimates, wherein the maximum likelihood estimations utilize $$L = \begin{bmatrix} l_{1,1} & 0 & 0 & \cdots & 0 \\ l_{2,1} & l_{2,2} & 0 & \cdots & 0 \\ l_{3,1} & l_{3,2} & l_{3,3} & \ddots & \vdots \\ \vdots & \vdots & \vdots & \ddots & 0 \\ l_{M,1} & l_{M,2} & l_{M,3} & \cdots & l_{M,M} \end{bmatrix}$$

where entries in matrix L are pre-calculated and stored using a pre-determined set of values of $f_d T$; and
modifying network functionality based, at least in part, on the speed of the remote mobile wireless device as indicated by the Doppler frequency.

2. The method of claim 1 wherein modifying network functionality based, at least in part, on the Doppler frequency comprises initiating a handover based at least in part on motion determined based, at least in part, on the Doppler frequency and physical locations of two or more base stations.

3. The method of claim 1 wherein modifying network functionality based, at least in part, on the Doppler frequency comprises causing transmission characteristics to be modified.

4. The method of claim 1 wherein the values comprise 0 to 0.04 with a step size of 0.001.

5. An apparatus comprising:
   an antenna to receive Orthogonal Frequency Division Multiplexed (OFDM) wireless signals from a remote mobile wireless device;
   control circuitry coupled with the antenna to extract multiple pilot carriers from the signal, to perform a frequency domain analysis on the extracted pilot carriers to determine a Doppler frequency corresponding to the remote mobile wireless device, wherein the Doppler frequency comprises the ratio of the speed of the remote mobile wireless device to the carrier wavelength, and to modify network functionality based, at least in part, on the speed of the remote mobile wireless device as indicated by the Doppler frequency wherein frequency domain analysis on the extracted pilot carriers to determine a Doppler frequency corresponding to the remote mobile wireless device comprises:
generating a plurality of channel estimates corresponding to the extracted pilot carriers; and
performing maximum likelihood estimations on the plurality of channel estimates utilizing $$L = \begin{bmatrix} l_{1,1} & 0 & 0 & \cdots & 0 \\ l_{2,1} & l_{2,2} & 0 & \cdots & 0 \\ l_{3,1} & l_{3,2} & l_{3,3} & \ddots & \vdots \\ \vdots & \vdots & \vdots & \ddots & 0 \\ l_{M,1} & l_{M,2} & l_{M,3} & \cdots & l_{M,M} \end{bmatrix}$$

where entries in matrix L are pre-calculated and stored using a pre-determined set of values comprising 0 to 0.04 with a step size of 0.001.

6. The apparatus of claim 5 wherein modification of the network functionality based, at least in part, on the Doppler frequency comprises initiating a handover based at least in part on motion determined based, at least in part, on the Doppler frequency and physical locations of two or more base stations.

7. The apparatus of claim 5 wherein modification of the network functionality based, at least in part, on the Doppler frequency comprises causing transmission characteristics to be modified.

8. An agent to control a base station in a wireless communications network comprising control logic to operate on a multi-path Orthogonal Frequency Division Multiplexed (OFDM) signal to extract multiple pilot carriers from the signal, to perform a frequency domain analysis on the extracted pilot carriers to determine a Doppler frequency corresponding to the remote mobile wireless device, and to modify network functionality based, at least in part, on the speed of the remote mobile wireless device as indicated by the Doppler frequency wherein frequency domain analysis on the extracted pilot carriers to determine a Doppler frequency corresponding to the remote mobile wireless device comprises:
generating a plurality of channel estimates corresponding to the extracted pilot carriers; and
performing maximum likelihood estimations on the plurality of channel estimates utilizing $$L = \begin{bmatrix} l_{1,1} & 0 & 0 & \cdots & 0 \\ l_{2,1} & l_{2,2} & 0 & \cdots & 0 \\ l_{3,1} & l_{3,2} & l_{3,3} & \ddots & \vdots \\ \vdots & \vdots & \vdots & \ddots & 0 \\ l_{M,1} & l_{M,2} & l_{M,3} & \cdots & l_{M,M} \end{bmatrix}$$

where entries in matrix L are pre-calculated and stored using a pre-determined set of values wherein the values comprise 0 to 0.04 with a step size of 0.001.

9. The agent of claim 8 wherein modification of the network functionality based, at least in part, on the Doppler frequency comprises initiating a handover based at least in part on motion determined based, at least in part, on the Doppler frequency and physical locations of two or more base stations.

10. The agent of claim 8 wherein modification of the network functionality based, at least in part, on the Doppler frequency comprises causing transmission characteristics to be modified.

* * * * *